(12) United States Patent
Song

(10) Patent No.: US 10,445,587 B2
(45) Date of Patent: Oct. 15, 2019

(54) DEVICE AND METHOD FOR AUTOMATIC MONITORING AND AUTONOMIC RESPONSE

(71) Applicant: AINEMO INC, Beijing (CN)

(72) Inventor: Chenfeng Song, Las Vegas, NV (US)

(73) Assignee: AINEMO INC., Beijing (CN)

( * ) Notice: Subject to any disclaimer, the term of this patent is extended or adjusted under 35 U.S.C. 154(b) by 51 days.

(21) Appl. No.: 15/316,451

(22) PCT Filed: Sep. 15, 2014

(86) PCT No.: PCT/CN2014/086571
§ 371 (c)(1),
(2) Date: Oct. 23, 2017

(87) PCT Pub. No.: WO2015/184700
PCT Pub. Date: Dec. 10, 2015

(65) Prior Publication Data
US 2018/0039837 A1 Feb. 8, 2018

(30) Foreign Application Priority Data
Jun. 5, 2014 (CN) .......................... 2014 1 0247458

(51) Int. Cl.
*G06K 9/00* (2006.01)
*G06K 9/62* (2006.01)
(Continued)

(52) U.S. Cl.
CPC ..... *G06K 9/00758* (2013.01); *G06K 9/00335* (2013.01); *G06K 9/6277* (2013.01);
(Continued)

(58) Field of Classification Search
None
See application file for complete search history.

(56) References Cited

U.S. PATENT DOCUMENTS 6,804,396 B2 * 10/2004 Higaki ............... G06K 9/00335
382/181
2011/0001813 A1 1/2011 Kim et al.
(Continued)

FOREIGN PATENT DOCUMENTS

CN 101408754 A 4/2009
CN 101807072 A 8/2010
(Continued)

OTHER PUBLICATIONS

English-language abstract of Chinese Patent Application No. CN 101807072 A.
(Continued)

*Primary Examiner* — Christopher Braniff
(74) *Attorney, Agent, or Firm* — Bayes PLLC

(57) ABSTRACT

The present invention discloses a device and method for automatic monitoring and autonomic response. The device comprises: a video capture unit, used for capturing and transmitting video in real time; an audio capture unit, used for capturing and transmitting audio in real time; a processing device, used for responding to received video and audio; a processing device, used for responding to the received video and audio, recognizing contents of the video and audio, and issuing instruction; and, a responder, used for receiving the instruction and responding according to the instruction. Compared with the prior art, the present invention allows a camera monitoring system to process automatically and respond autonomously when a certain scenario is monitored, while obviating the need for human intervention.

16 Claims, 4 Drawing Sheets

(51) Int. Cl.
*G06K 9/66* (2006.01)
*G10L 17/00* (2013.01)
*H04N 5/232* (2006.01)
*H04N 7/18* (2006.01)

(52) U.S. Cl.
CPC .............. *G06K 9/66* (2013.01); *G10L 17/005* (2013.01); *H04N 5/23293* (2013.01); *H04N 7/183* (2013.01); *G06K 9/00288* (2013.01)

(56) References Cited

U.S. PATENT DOCUMENTS

| | | | |
|---|---|---|---|
| 2012/0014659 A1* | 1/2012 | Hugosson | G08B 13/19669 386/228 |
| 2012/0134548 A1 | 5/2012 | Rhoads et al. | |
| 2015/0309579 A1* | 10/2015 | Wang | G06F 3/017 345/156 |
| 2016/0171289 A1* | 6/2016 | Lee | G06F 3/14 382/118 |

FOREIGN PATENT DOCUMENTS

| | | |
|---|---|---|
| CN | 102542739 A | 7/2012 |
| CN | 102824092 A | 12/2012 |
| CN | 102932212 A | 2/2013 |
| CN | 202801140 U | 3/2013 |
| CN | 103329147 A | 9/2013 |
| CN | 103472796 A | 12/2013 |
| CN | 104023208 A | 9/2014 |

OTHER PUBLICATIONS

English-language abstract of Chinese Patent Application No. CN 102824092 A.
English-language abstract of Chinese Patent Application No. CN 104023208 A.
First Office action issued in parallel Chinese Application No. 201410247458.7, dated Oct. 9, 2016, 9 pages.

* cited by examiner

DEVICE AND METHOD FOR AUTOMATIC MONITORING AND AUTONOMIC RESPONSE

This application claims the benefit of a Chinese patent application No. 201410247458.7 filed on Jun. 5, 2014, with the title "DEVICE AND METHOD FOR AUTOMATIC MONITORING AND AUTONOMIC RESPONSE"; the entire content of which is incorporated herein by reference.

TECHNICAL FIELD

The disclosure relates generally to communication technologies, and more particularly, to a device and method for automatic monitoring and autonomic response.

BACKGROUND

In the prior art, there is a home camera monitoring system. A camera is installed in the home and the captured video is displayed on the monitor screen. However, this home camera monitoring system can only perform monitoring functions. If you need to monitor a situation, still need people to deal with.

SUMMARY

One of the technical problems addressed by the present invention is that the camera monitoring system can automatically handle and react autonomously while monitoring certain cases without requiring human intervention.

According to an embodiment of an aspect of the present invention, there is provided an automatic monitoring and autonomous reaction device comprising: a video capturing unit for collecting and transmitting video in real time; an audio capturing unit for collecting and transmitting audio in real time; a processing device for recognizing the content of the video and audio and issuing an instruction in response to the received video and audio; a responder for receiving said instruction and responding to said instruction.

According to an embodiment of the present invention, the responder comprises one or more of: an actuator for generating a specific reaction in response to the instruction being information requiring a specific reaction; a speaker for issuing a specific response sound in response to the instruction being information requesting a specific response sound; a display for displaying a specific reaction picture in response to the instruction being information indicating that a specific reaction screen is required to be displayed.

According to an embodiment of the present invention, the processing device is coupled or comprises a storage for storing monitoring and response records, and in response to a retrieval request, the processing device retrieves the relevant record on the storage.

According to an embodiment of the present invention, the processing device identifies a specific action of a person or a specific person from the video and audio captured by the video capture unit and the audio capturing unit, and issues an instruction corresponding to a specific action of the person or a specific action of a specific person.

According to an embodiment of the present invention, the person or a specific person is identified based on one or more of face recognition, height recognition, and voice recognition.

According to an embodiment of the present invention, the processing device further receives a wireless signal from the mobile phone, identifying the person or specific person based on the identity of the mobile phone indicated in the wireless signal.

According to an embodiment of the present invention, the specific action is identified by establishing a model for a specific action in advance and searching the video and audio collecting from the video capturing unit and the audio capturing unit respectively for an action matching with the established model.

According to one embodiment of the present invention, the model is generated by self-learning.

According to one embodiment of the present invention, the model is a preset standardized model.

According to an embodiment of the present invention, the automatic monitoring and autonomous reaction device further comprises a depth sensor, which is based on the video and audio acquired by the video capturing unit and the audio capturing unit as well as the depth detected by the depth sensor.

According to an embodiment of the present invention, the processing device matches the model in the storage in response to the specific action identified and/or the specific action of the specific person, predicts next possible action, and issues an instruction corresponding to the predicted action to the actuator, then the actuator performs the predicted action based on the instruction.

According to an embodiment of the present invention, the storage further stores a restriction condition corresponding to a specific action and/or a specific person's specific action, and forced actions which should be performed if the restriction condition is satisfied; the processing device searches for a restriction condition corresponding to identified specific action and/or a specific person's specific action, and determines whether or not the restriction condition is satisfied; if the restriction condition is not satisfied, then issuing an instruction corresponding to the forced action to the actuator, and the actuator generates the forced action based on the instruction.

According to an embodiment of the present invention, the storage further stores a restriction condition corresponding to a specific action and/or a specific person's specific action, the processing device searches for a restriction condition corresponding to identified specific action and/or a specific person's specific action, and determines whether or not the restriction condition is satisfied; and if the restriction condition is not satisfied, issuing an instruction for alarm to the speaker and the display; and the speaker or the display issues an alarm sound or an alarm screen based on the instruction.

According to an embodiment of the present invention, the storage further stores an interactive sound or picture corresponding to a specific action and/or a specific person's specific action, the processing device searches for interactive sound or picture corresponding to identified specific action and/or a specific person's specific action, and issuing instructions corresponding to said interactive sound or picture to the speaker or the display, the interactive sound is generated by the speaker based on the instruction, or the interactive picture is displayed by the display based on the instruction.

According to one embodiment of the present invention, providing an automated monitoring and autonomous reaction method comprising the steps of: capturing video and audio of the environment; in response to the captured video and audio, identifying the content of the video and audio; reacting based on the identified results.

According to one embodiment of the present invention, the reaction comprises one or more of the following: performing a specific reaction; generating a specific reaction sound; displaying a specific reaction screen.

According to an embodiment of the present invention, step of identifying the content of the video and audio comprises identifying a specific action and/or a specific person's specific action from the acquired video and audio.

According to an embodiment of the present invention, the person or a specific person is identified based on one or more of face recognition, height recognition, and voice recognition.

According to an embodiment of the present invention, the method further comprises receiving a wireless signal from a mobile phone and said person or specific person being identified based on the identity of the mobile phone indicated in the wireless signal.

According to an embodiment of the present invention, the specific action is based on the acquired video, audio, and a depth detected by a depth sensor.

According to an embodiment of the present invention, the specific action is to establish a model for a specific action in advance and to search for the matching of the established model from the acquired video and audio.

According to one embodiment of the present invention, the model is generated by self-learning.

According to one embodiment of the present invention, the model is a preset normalized model.

Since one embodiment of the present invention can recognize the acquired video and audio contents and react to the contents of the identified video and audio, it is possible to realize that the camera monitoring system can automatically process and, in some cases, response without the effect of human intervention.

It will be understood by those of ordinary skill in the art that although the following detailed description will be made with reference to the illustrated embodiments and the accompanying drawings, the invention is not limited to these embodiments. Rather, the scope of the invention is broadly and is intended to limit the scope of the invention by the claims appended hereto.

BRIEF DESCRIPTION OF THE DRAWINGS

Other features, objects, and advantages of the present invention will become apparent by reading the following detailed description of the non-limiting embodiments with reference to the following drawings.

The same or similar reference numerals in the drawings refer to like or similar parts.

DETAILED DESCRIPTION

The invention will now be described in further detail with reference to the accompanying drawings.

Figure 1:
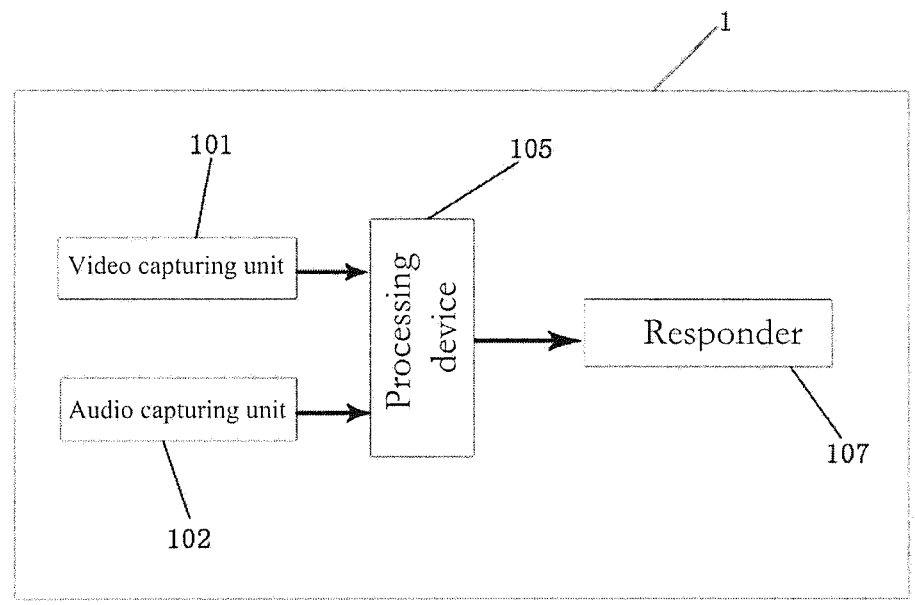
FIG. 1 shows a schematic block diagram of an automatic monitoring and autonomous reaction device according to one embodiment of the present invention.

FIG. 1 shows a schematic block diagram of an automatic monitoring and autonomous reaction device (nemo) 1 according to one embodiment of the present invention. The automatic monitoring and autonomous reaction device 1 according to one embodiment of the present invention includes a video capturing unit 101, an audio capturing unit 102, a processing device 105, and a responder 107. The video capturing unit 101 and the audio capturing unit 102 collect the audio and audio in real time and send it to the processing device 105, respectively. The processing device 105 identifies the contents of the video and audio in response to the received video and audio and issues the instruction to the responder 107. The responder 107 receives the instruction and reacts according to the instruction.

The video capture unit refers to a device for video capture, such as a camera, a video camera, a mobile phone with an image pickup function, and the like. The audio capturing unit refers to a device for audio acquisition, such as a microphone, a recorder, a mobile phone with a recording function, and the like. The processing device refers to a device having a data processing and analysis function for receiving video and audio sent by a video capturing unit and an audio capturing unit and processing, identifying and issuing the corresponding instruction to the video and audio, for example, a CPU chip, a computer or a computer composed of multiple processing center.

The processing device is coupled or comprises a storage 1051 for storing monitoring and reaction records. In response to the retrieval request, the processing device 105 retrieves the relevant record on the storage 1051.

Figure 5:
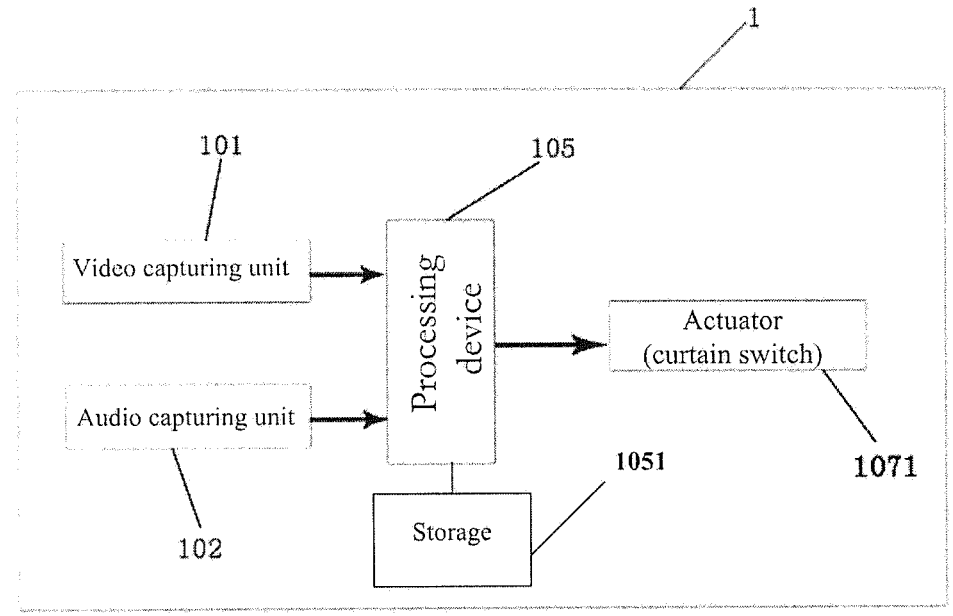
FIG. 5 shows a schematic block diagram of a predictive execution system triggered by a behavior mode according to one embodiment of the present invention.

As shown in FIG. 5, the responder 107 may include one or more of the following: an actuator 1071, a speaker 1072, and a display 1073. The actuator 1071 is, for example, a curtain switch, an electric light switch, a water heater switch, and the like, and generates a specific reaction in response to the instruction that is required to generate a specific reaction. The speaker 1072 is, for example, a computer speaker, a peripheral independent speaker, a loudspeaker, and the like, for issuing a specific response sound in response to the instruction being information requesting a specific response sound. The display 1073 is, for example, a computer screen, a television screen, an external display screen, and the like, and displays a specific reaction screen in response to the instruction being information indicating that a specific reaction screen is required to be displayed.

A variety of types included in the responder increase the type and flexibility of the reaction and improve the user experience.

Figure 2:
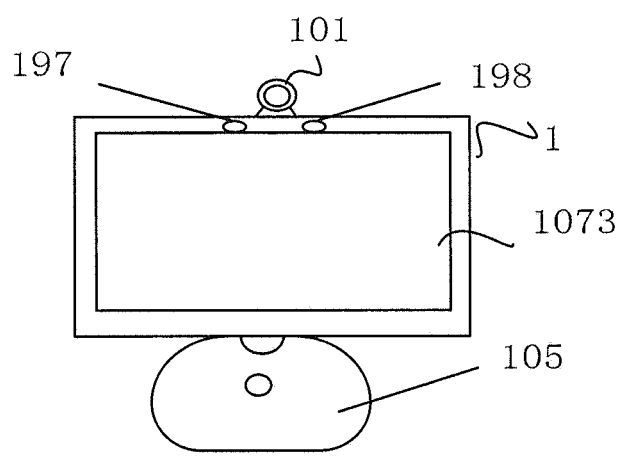
FIG. 2 shows an external front view of an automatic monitoring and autonomous reaction device according to one embodiment of the present invention.

FIG. 2 shows an external front view of an automatic monitoring and autonomous reaction device according to one embodiment of the present invention. In this embodiment, the video capturing unit 101 is a camera located at the upper position of the display 1073. In this embodiment, the processing device 105 is enclosed in a base.

In operation, the video capturing unit 101 and the audio capturing unit 102 send the visual and audio captured to the processing device 105, and the processing device 105 identifies the received video and audio, identifies the specific action or the specific person's specific action, gives the responder 107 corresponding instructions, and one or more of actuators 1071, the speaker 1072, and the display 1073 are instructed to perform the corresponding operation.

The instruction may be instruction for generating a specific action, instruction for issuing a specific sound, or instruction for displaying a specific screen.

In this way, it is possible to realize whether a specific action has occurred in the automatic monitoring environment or whether a specific person has performed a specific action. Once a specific action has occurred, the beneficial effect of the corresponding reaction is generated.

The automatic monitoring and autonomous reaction device 1 may communicate with each other through a video capture unit 101, an audio capturing unit 102, and other devices or units, one of the identities based on face recognition, height recognition, voice recognition, or a wireless signal issued by a mobile phone to identify people or specific people. Compared to a single way to identify, a variety of ways to identify people, increase the accuracy of people to identify.

In the case of identifying a person, because the pattern of the human face is very much like that of the vast majority of people, the person's voice frequency is within a certain range, so that, for example, when a certain area of a captured image is similar to the pattern of the stored face; and/or the distance between the face and the automatic monitoring and autonomous reaction device 1 sensed by the position sensor and/or the depth sensor indicate that the height of an object is within a certain range; and/or the voice acquired by the audio capturing unit 102 is also within a certain frequency range, the presence of a person is identified.

In the case of identifying a specific person, the pattern and/or the height and/or the voice frequency of the person's face of a specific person may be stored in the storage in advance. When a certain area in the captured image matches the stored pattern of the specific face; and/or the distance between the specific face and the automatic monitoring and autonomous reaction device 1 detected by the position sensor and/or the depth sensor indicate the height of the person matches with the height of a specific person stored in the storage; and/or the voice acquired by the audio capturing unit 102 matches the frequency of the stored specific person's voice, the specific person is identified.

The existence of a person or a specific person can also be done by self-learning. For example, if a pattern in the captured image always appears at the same time as a certain frequency of the acquired voice, a prompt can be displayed on the display, that is, the person is identified, and the user of the automatic monitoring and autonomous reaction device 1 shall confirm and named the identified person. If the user of the automatic monitoring and autonomous reaction device 1 indicates that the identified object is not correct, he shall give feedback on the interface of the display of the automatic monitoring and autonomous reaction device 1. When this feedback is received, the same captioned image occurring with the same frequency of captured voice is not considered as the present of a person or a specific person. In the self-learning mode, it is also possible to store the patterns of the specific person's face and/or the height and/or the voice frequency in the storage in advance.

In addition, it is also possible to identify people or specific people based on the wireless signals that are sent by the mobile phone. For example, the automatic monitoring and autonomous reaction device 1 has a Bluetooth device, and the user's handset also has a Bluetooth wireless unit. It is considered that a specific person is identified when the automatic monitoring and autonomous reaction device 1 recognizes that the Bluetooth wireless unit of a specific identity is presented in certain distance.

The specific action is to establish a model for a specific action in advance and to search and match the video and audio acquired by the video capturing unit 101 and the audio capturing unit 102, respectively, for matching with the established model.

Optionally, the model is a preset standardized model, that is, artificially set and modeled according to the set action. For example, for an action to watch TV, create a model: identify a person sitting on the sofa; look along the direction of the person's eyes, there is an object; identify the object is the TV; the person's eyes stay on the TV at least 10 seconds. If the person is detected from the image taken from the video capturing unit 101 and then the person is seated on the sofa (the recognition of a sofa is similar to face recognition, it is also possible to perform the pattern matching, or taking the image of a person sitting on the sofa as a whole as a target for pattern matching recognition), and then detect the person's gaze direction, and then detect whether the object in the direction of the person's eyes is a TV (for example, the TV as an object to match the pattern), then countdowns 10 seconds. If it reaches 10 seconds, the action of watch TV is detected.

Of course, the processing device 105 may automatically establish an action model by self-learning such as machine learning. For example, the processing device 105 extracts an action feature from the video and audio captured by the video capture unit 101, the audio capturing unit 102, and creates an action model based on the extracted feature. For example, from the video capture unit 101, the audio collection unit 102 acquires the audio and audio, it is found that there is a person sitting on the sofa, and there is a television in the direction of the person's eyes, and the time of the person's eyes stay on the television exceeds 10 seconds or a threshold, the above action is recognized as a specific action model. In this case, the action model may not be stored in the storage in advance, but the model of the action is extracted in a learning manner from the captured video and audio.

To more accurately identify a specific action, the automatic monitoring and autonomous reaction device 1 also includes a depth sensor 197. A specific action is identified by the video and audio captured by the video capturing unit 101 and the audio capturing unit 102, and the depth sensed by the depth sensor. Although the depth sensor 197 is in the left position of the center of the upper frame of the display in FIG. 2, it may also be provided at other reasonable positions.

The depth sensor 197 senses the distance between a person or object and the automatic monitoring and autonomous reaction device 1. When the person or object perform an action, the same magnitude of motion varies in the image to be captured depending on the distance of the person or object from the automatic monitoring and the autonomous reaction device 1. Therefore, combined with the depth sensor, the action can be more accurate identification, thereby enhancing the recognition accuracy.

Figure 3:
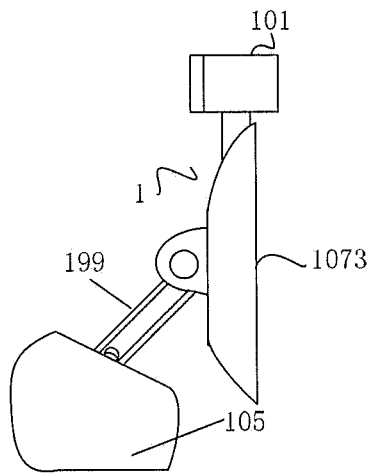
FIG. 3 shows an external left view of an automatic monitoring and autonomous reaction device according to one embodiment of the present invention.

FIG. 3 shows an external left view of an automatic monitoring and autonomous reaction device according to one embodiment of the present invention. As shown in FIG. 3, the automatic monitoring and autonomous reaction device 1 may also include a rotation device 199 for rotating the video capturing unit 101 to better collect information. It is preferable that the rotation device 199 rotates the video capturing unit 101 in the direction facing the identified element, when one of the following elements identified in the audio and video acquired from the video capturing unit 101 and the audio capturing unit 102, respectively: person or specific person; specific action; abnormal condition.

In one embodiment, the video capture unit 101 shown in FIG. 3 may rotate left or right toward the identified elements. In another embodiment, the video capture unit 101 shown in FIG. 3 may be rotated up, down, left and right toward the identified elements.

As shown in FIG. 2, the automatic monitoring and autonomous reaction device 1 may further include a light sensor 198 for sensing a change in the ambient light and the ambient light surrounding the automatic monitoring and autonomous reaction device 1, wherein the display brightness of the display 1073 is Adjusted according to the change of the light. If the surrounding light is strong, you can increase the display brightness of the display. If the surrounding light is weak, you can reduce the display brightness of the display. In this way, you can reduce the discomfort of the eyes to monitor the monitor.

Although the light sensor in FIG. 2 is located at the right side of the center of the display, it can also be set at any other reasonable position.

The following are some typical application scenarios of the embodiments of the present invention.

I. Behavior Mode Triggered by the Predictive Execution System

FIG. 5 shows a schematic block diagram of a predictive execution system triggered by a behavior mode according to one embodiment of the present invention. In this embodiment, every time when the user returns to the home, firstly the user would put on slippers, and then went to the curtains to open the curtains. The automatic monitoring and autonomous reaction device 1 of the present embodiment will learn the behavior mode of the user, and when the user returns home, the user will automatically pull the curtains after changing the slippers.

In this embodiment, the actuator 1071 is a curtain switch.

FIG. 5 shows the behavior of the pattern triggered by the implementation of the specific process is as follows. The storage 1051 stores a record of each action of everyone identified by the video capturing unit 101, the audio capturing unit 102, and the like. Although some of the actions do not result in a reaction of the responder, these actions are still recorded in the storage 1051. When some of the actions occur consecutively for more than one preset threshold, these successive actions are recorded in the storage 1051 as a model. For example, when the user entered from the door—put on slippers—pull curtains this series of actions appear more than 10 times, then the user entered from the door—put on slippers—pull curtains recorded as a model. Now, when the processing device 105 recognizes a member of the family or a specific person come home, and then put on the slipper, based on the video capturing unit 101, the audio collection unit 102, etc. it is considered that the action of the person matches this model "entered from the door—put on slippers—pull curtains" stored in the storage, thus predicting the next step may be the action is to pull the curtains. Accordingly, the processing device 105 issues instruction for pulling the curtains to the curtain switch, and the curtain switch pulls the curtain based on the instruction.

Types of application scenarios, for example, the user come from the door, get into the bathroom under the shower faucet, take off the wall hanging bath supplies, then the automatic monitoring and autonomous reaction device 1 automatically help users open the bath faucet and so on.

II. Behavior Mode Triggers a Corrective Actuation System

Figure 6:
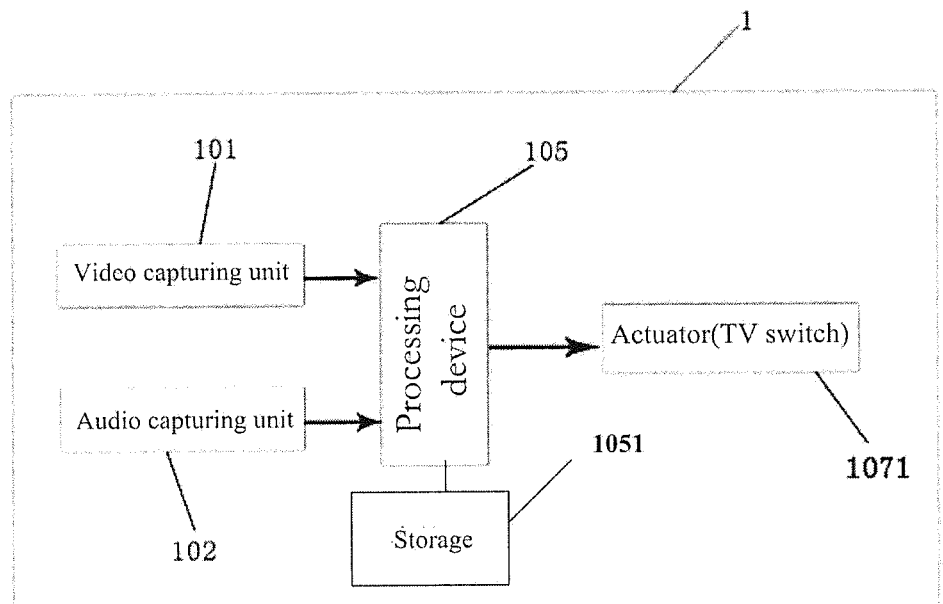
FIG. 6 shows a schematic block diagram of a corrective actuation system triggered by a behavior pattern in accordance with one embodiment of the present invention.

FIG. 6 shows a schematic block diagram of a corrective actuation system triggered by a behavior mode according to one embodiment of the present invention. In the present embodiment, the parent presets that the time for the child to watch the television cannot exceed 3 hours. If more than 3 hours, the TV automatically shut down.

In this embodiment, the actuator 1071 is a television switch.

The behavior of the corrective actuation system triggered by the behavior mode of FIG. 6 is as follows.

The storage 1051 stores a restriction condition corresponding to a specific action and/or a specific person's specific action, and a forced action if the restriction condition is satisfied. For example, the children watch TV—no more than 3 hours—automatic shutdown.

The processing device retrieves a specific action corresponding to the specific action and/or a specific person's specific action in response to the specific action and/or specific person-specific actions identified by the video and audio acquired from the video capturing unit 101, the audio capturing unit 102 It is judged whether or not the restriction condition is satisfied, and in response to judging that the restriction condition is not satisfied, instruction corresponding to the forced action is issued to the actuator 1071, and the actuator 1071 generates a forced action based on the instruction. For example, the processing device recognizes that the child is watching TV, then retrieves an instruction "the child watching television—no more than 3 hours—automatically shuts down" from the storage 1051, and then monitors the duration of the child watching the TV, and when more than 3 hours, send instruction to the TV switch to shut down TV. The TV switch is shut down TV according to the instruction.

Other applications such as the scenario, for example, sleep more than 8 hours to automatically turn on the window so that users get up and so on.

III. Behavior Mode Triggered by the Alarm System

Figure 7:
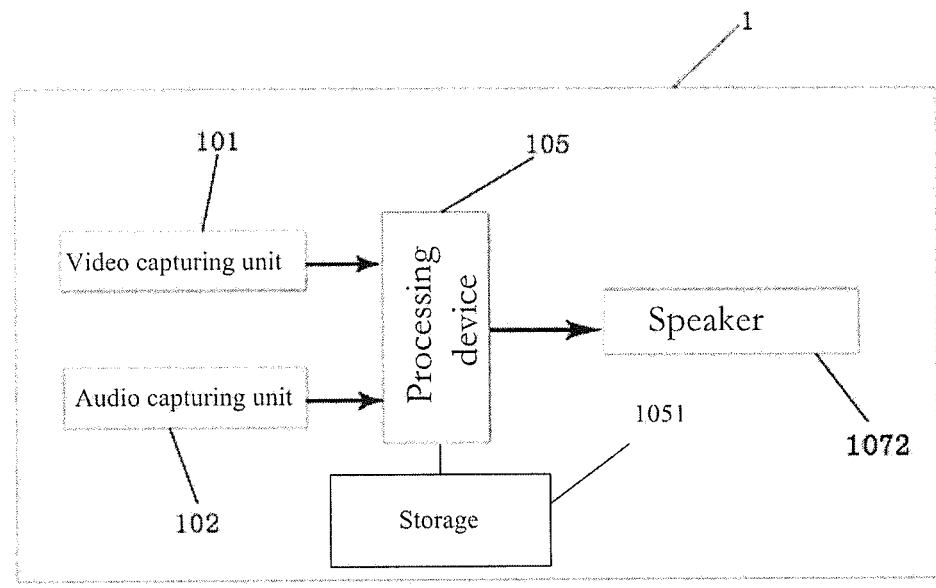
FIG. 7 shows a schematic block diagram of an alarm system triggered by a behavior mode according to one embodiment of the present invention.

FIG. 7 shows a schematic block diagram of an alarm system triggered by a behavior mode according to one embodiment of the present invention. In the present embodiment, when the child watches the television for more than three hours, the television is not forced to be shut down, but the speaker is given an alarm.

The behavior of the alarm system triggered by the action mode is as follows.

The storage 1051 stores a restriction condition corresponding to a specific action and/or a specific person's specific action. For example, the children watch TV—no more than 3 hours.

The processing device 105 retrieves a restriction condition corresponding to the specific action and/or a specific person's specific action in response to a specific action identified by the specific action and/or a specific person, judges whether the restriction condition is satisfied, and in response to determining the restriction condition is not satisfied, and the instruction indicating the alarm is issued to the speaker 1072. The speaker 1072 generates an alarm sound based on the instruction. For example, the processing device 105 recognizes that the child watching the television, retrieves a message storage 1051 "the child watching the television—no more than 3 hours", and monitors the time of the child watching the television. When it is judged that it has exceeded 3 hours, an instruction is given to the speaker indicating that the speaker has issued an alarm. The alert is like a beep.

In addition, you can record a special alarm for the scenario, such as "you watch TV has more than 3 hours, have a rest" and associated with the message "children watching TV—not more than 3 hours" in the storage. The processing device 105 recognizes that the child watching TV, then retrieves the message from the storage 1051 that child watching the TV—no more than 3 hours—"you have watched the TV for more than three hours, have a rest", monitor the time of watching TV. When it is judged that it has exceeded 3 hours, an instruction is given to the speaker indicating that the speaker has issued a voice alarm that "you have watched the TV for more than three hours, have a rest".

Although the speaker 1072 is shown in FIG. 7, the speaker 1072 may be replaced with the display 1073. When the processing device sends a command message to the display prompt alarm, the display displays the alarm screen based on the instruction.

IV. Behavior Mode Triggers an Interactive System

Figure 8:
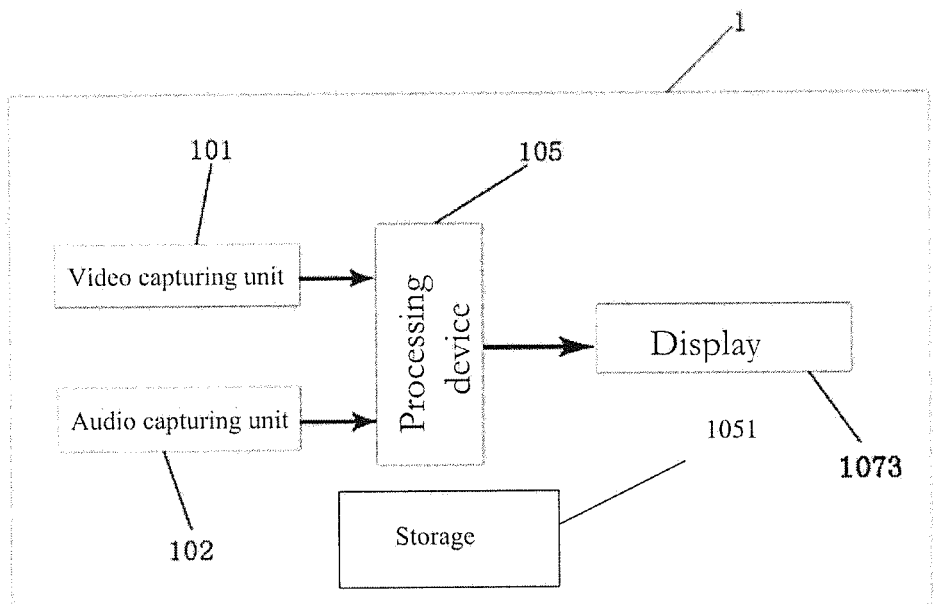
FIG. 8 shows a schematic block diagram of an interactive system triggered by a behavior pattern in accordance with one embodiment of the present invention.

FIG. 8 shows a schematic block diagram of an interactive system triggered by a behavior pattern in accordance with one embodiment of the present invention. In the present embodiment, when a person comes to the front of the washing machine, the operation of the washing machine is automatically displayed on the display 1073 for reference.

The behavioral mode triggers the interaction of the system as follows.

The storage 1051 stores an interactive picture corresponding to a specific action and/or a specific person's specific action. For example, a person come to the front of the washing machine—including the operation of the washing machine screen.

The processing device 105 retrieves interactive picture corresponding to the specific actions and/or specific person's specific actions in response to the specific actions and/or specific person's specific actions identified from the audio and audio provided by the video capture unit 101 and the audio capturing unit 102. The interactive picture is displayed, and the instruction corresponding to the interactive picture is issued to the display 1073. The interactive image is displayed by the display 1073 based on the instruction. For example, when the processing device 105 recognizes that the person has come to the front of the washing machine, the storage 1051 retrieves the entry of the person carrying the operation step of the washing machine in front of the washing machine, sends an instruction to the display 1073, and display the steps of operating the washing machine.

Of course, the display 1073 may be replaced by the speaker 1072. That is, the storage 1051 stores interactive sound corresponding to a specific action and/or a specific person's specific action. The processing device 105 retrieves the interactive sound corresponding to the specific action and/or the specific person's specific action in response to the specific action and/or the specific person's specific action is identified, and issues the instruction corresponding to the interactive sound to the speaker 1072 or the display 1073. Interactive sound generated by the speaker 1072 based on the instruction.

According to an embodiment of the present invention, the video capturing unit 101 is rotatable for better acquisition of information. Preferably, the automatic monitoring and autonomous reaction device 1 recognizes one of the following elements based on the video acquired by the video capturing unit 101 and the audio capturing unit 102, and the video capturing unit 101 rotates in the direction facing the identified elements: person or specific person; specific action.

In one embodiment, the video capture unit 101 shown in FIG. 3 may rotate left and right toward the identified elements. In another embodiment, the video capture unit 101 shown in FIG. 3 may be rotated up, down, left and right toward the identified elements.

Figure 4:
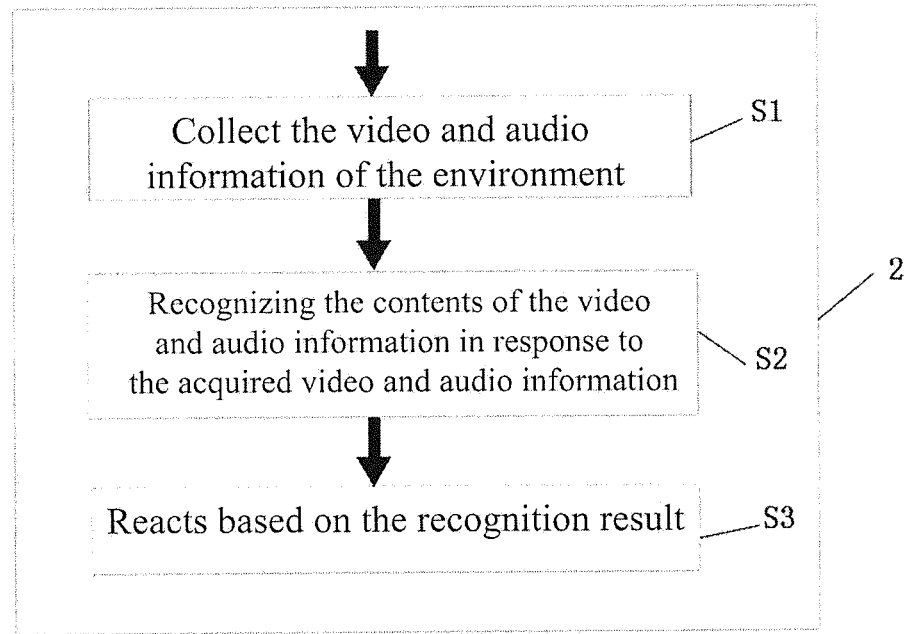
FIG. 4 shows a flow diagram of an automated monitoring and autonomous response method according to one embodiment of the present invention.

FIG. 4 shows a flow chart of an automatic monitoring and autonomous reaction method 2 according to one embodiment of the present invention. Automatic monitoring and autonomous response method 2 includes:

Step S1: Collect the video and audio of the environment;

Step S2: recognizing the contents of the video and audio in response to the acquired video and audio;

Step S3: reacts based on the recognition result.

Optionally, the reaction may include one or more of the following: generating a specific reaction; issuing a specific reaction sound; displaying a specific reaction picture.

Optionally, the content identifying the content of the video and audio in response to the acquired video, audio, may include identifying a specific action and/or a specific person's specific action from the acquired video and audio.

Optionally, the person or person may be identified based on one or more of face recognition, height recognition, and voice recognition.

Optionally, the method may further comprise receiving a wireless signal from a mobile phone and the person or a specific person is identified based on the identity of the mobile phone indicated in the wireless signal.

Optionally, the specific action may be based on the acquired video, audio, and the depth detected by a depth sensor.

Alternatively, a specific action may be made by setting up a model for a specific action in advance and searching from the acquired video and audio for matching with the established model.

Optionally, the model may be generated by self-learning.

Optionally, the model may be a preset normalized model.

The flowcharts and block diagrams in the figures show the architecture, functions, and operations of the systems, methods, and computer program products that may be implemented in accordance with various embodiments of the present invention. In this regard, each of the blocks in the flowchart or block diagram may represent a module, block, or part of a code that contains one or more portions of the module, block, or code for implementing the prescribed logic functions Executable instructions. It should also be noted that in some implementations as a replacement, the functions marked in the box may also occur in a different order than that noted in the figures. For example, two consecutive blocks can be executed substantially in parallel, and they can sometimes be executed in the reverse order, depending on the function involved. It should also be noted that each block in the block diagram and/or flowchart, as well as the combination of blocks in the block diagram and/or flowchart, may be implemented with a dedicated hardware-based system that performs a specified function or operation, or can be implemented with a combination of dedicated hardware and computer instructions.

It will be apparent to those skilled in the art that the present invention is not limited to the details of the above-described exemplary embodiments and that the invention may be practiced in other specific forms without departing from the spirit or essential characteristics thereof. Accordingly, the scope of the invention should be considered by way of example only and not by way of limitation, and the scope of the invention is defined by the appended claims rather than by the foregoing description, and is therefore intended to be carried out with respect to the claims and all changes which come within the scope of the present invention are intended to be included within the scope of the present invention. Any reference signs in the claims should not be construed as limiting.

What is claimed is:

1. An automatic monitoring and autonomous reaction device, comprising:
   a video capturing unit for collecting and transmitting video in real time;
   an audio capturing unit for collecting and transmitting audio in real time;
   a processing device for recognizing the content of the video and audio and issuing an instruction in response to the received video and audio; and
   a responder for receiving said instruction and responding to said instruction, the responder including one or more of the following:
      an actuator for generating a specific reaction in response to the instruction being information requiring a specific reaction;
      a speaker for issuing a specific response sound in response to the instruction being information requesting a specific response sound; and
      a display for displaying a specific reaction picture in response to the instruction being information indicating that a specific reaction screen is required to be displayed,
   wherein the processing device is coupled to or includes a storage for storing monitoring and response records, and in response to a retrieval request, the processing device retrieves relevant record on the storage;
   wherein the processing device identifies a specific action of a person or a specific person from the video and audio captured by the video capture unit and the audio capturing unit, and issues an instruction corresponding to the specific action of the person or the specific action of the specific person; and
   wherein the processing device matches a model in the storage in response to the specific action identified and/or the specific action of the specific person, predicts next possible action, and issues an instruction corresponding to the predicted action to the actuator, then the actuator performs the predicted action based on the instruction.

2. The automatic monitoring and autonomous reaction device of claim 1, wherein the person or the specific person is identified based on one or more of face recognition, height recognition, and voice recognition.

3. The automatic monitoring and autonomous reaction device of claim 1, wherein the processing device further receives a wireless signal from a mobile phone, identifying the person or the specific person based on an identity of the mobile phone indicated in the wireless signal.

4. The automatic monitoring and autonomous reaction device of claim 1, wherein the specific action is identified by establishing a model for the specific action in advance and searching the video and audio collecting from the video capturing unit and the audio capturing unit respectively for an action matching with the established model.

5. The automatic monitoring and autonomous reaction device of claim 4, wherein said model is generated by self-learning.

6. The automatic monitoring and autonomous reaction device of claim 4, wherein the model is a preset standardized model.

7. The automatic monitoring and autonomous reaction device of claim 1, further comprising a depth sensor, which is based on the video and audio acquired by the video capturing unit and the audio capturing unit as well as the depth detected by the depth sensor.

8. The automatic monitoring and autonomous reaction device of claim 1, wherein the storage further stores a restriction condition corresponding to a specific action and/or a specific person's specific action, and forced actions which should be performed if the restriction condition is satisfied; the processing device searches for a restriction condition corresponding to identified specific action and/or a specific person's specific action, and determines whether or not the restriction condition is satisfied; and if the restriction condition is not satisfied, then issuing an instruction corresponding to the forced action to the actuator, and the actuator generates the forced action based on the instruction.

9. The automatic monitoring and autonomous reaction device of claim 1, wherein the storage further stores a restriction condition corresponding to a specific action and/or a specific person's specific action, the processing device searches for a restriction condition corresponding to identified specific action and/or a specific person's specific action, and determines whether or not the restriction condition is satisfied; and if the restriction condition is not satisfied, issuing an instruction for alarm to the speaker and the display; and the speaker or the display issues an alarm sound or an alarm screen based on the instruction.

10. The automatic monitoring and autonomous reaction device of claim 1, wherein the storage further stores an interactive sound or picture corresponding to a specific action and/or a specific person's specific action, the processing device searches for interactive sound or picture corresponding to identified specific action and/or a specific person's specific action, and issuing instructions corresponding to said interactive sound or picture to the speaker or the display, the interactive sound is generated by the speaker based on the instruction, or the interactive picture is displayed by the display based on the instruction.

11. An automated monitoring and autonomous reaction method, comprising:
   providing an automatic monitoring and autonomous reaction device, including:
      a video capturing unit for collecting and transmitting video in real time;
      an audio capturing unit for collecting and transmitting audio in real time;
      a processing device for recognizing the content of the video and audio and issuing an instruction in response to the received video and audio; and
      a responder for receiving said instruction and responding to said instruction, the responder including one or more of the following:
         an actuator for generating a specific reaction in response to the instruction being information requiring a specific reaction;
         a speaker for issuing a specific response sound in response to the instruction being information requesting a specific response sound; and
         a display for displaying a specific reaction picture in response to the instruction being information indicating that a specific reaction screen is required to be displayed;
      wherein the processing device is coupled to or includes a storage for storing monitoring and response records, and in response to a retrieval request, the processing device retrieves relevant record on the storage;

wherein the processing device identifies a specific action of a person or a specific person from the video and audio captured by the video capture unit and the audio capturing unit, and issues an instruction corresponding to the specific action of the person or the specific action of the specific person; and wherein the processing device matches a model in the storage in response to the specific action identified and/or the specific action of the specific person, predicts next possible action, and issues an instruction corresponding to the predicted action to the actuator, then the actuator performs the predicted action based on the instruction;

capturing video and audio of an environment with the video capturing unit and the audio capturing unit;

in response to the captured video and audio, identifying the content of the video and audio by the processing device; and reacting by the responder based on identified results.

12. The method of claim 11, wherein the reacting comprises one or more of the following: performing a specific reaction; generating a specific reaction sound; and displaying a specific reaction screen.

13. The method of claim 11, wherein the step of identifying the content of the video and audio comprises identifying a specific action and/or a specific person's specific action from the acquired video and audio.

14. The method of claim 13, wherein the person or a specific person is identified based on one or more of face recognition, height recognition, and voice recognition.

15. The method of claim 13, further comprising receiving a wireless signal from a mobile phone and said person or specific person being identified based on the identity of the mobile phone indicated in the wireless signal.

16. The method of claim 13, wherein the specific action is based on the acquired video, audio, and a depth detected by a depth sensor.

* * * * *